(12) United States Patent
Champion

(10) Patent No.: US 10,091,978 B2
(45) Date of Patent: Oct. 9, 2018

(54) LEVER-OPERATED FISHING REEL

(71) Applicant: Mark E. Champion, Aransas Pass, TX (US)

(72) Inventor: Mark E. Champion, Aransas Pass, TX (US)

( * ) Notice: Subject to any disclaimer, the term of this patent is extended or adjusted under 35 U.S.C. 154(b) by 333 days.

(21) Appl. No.: 15/084,446

(22) Filed: Mar. 29, 2016

(65) Prior Publication Data

US 2016/0286774 A1    Oct. 6, 2016

Related U.S. Application Data

(60) Provisional application No. 62/142,452, filed on Apr. 2, 2015.

(51) Int. Cl.
| | | |
|---|---|---|
| *A01K 89/01* | (2006.01) | |
| *A01K 89/015* | (2006.01) | |
| *A01K 89/00* | (2006.01) | |

(52) U.S. Cl.
CPC ........ *A01K 89/0186* (2015.05); *A01K 89/006* (2013.01)

(58) Field of Classification Search
CPC .............. A01K 89/0117; A01K 89/015; A01K 89/0183; A01K 89/0185; A01K 89/0186; A01K 89/058; A01K 89/059
See application file for complete search history.

(56) References Cited

U.S. PATENT DOCUMENTS

| | | | |
|---|---|---|---|
| 360,758 A | 4/1887 | Calder | |
| 580,025 A | 4/1897 | Williams | |
| 1,906,425 A | 5/1933 | Scott | |
| 2,428,908 A | 10/1947 | Cooper et al. | |
| 2,591,338 A | 4/1952 | Cooper | |
| 3,446,453 A * | 5/1969 | Pachner | A01K 89/051 |
| | | | 242/256 |
| 4,524,922 A | 6/1985 | Vivarelli | |
| 5,443,218 A * | 8/1995 | Ciocca | A01K 89/01 |
| | | | 242/256 |
| 5,918,826 A * | 7/1999 | Arkowski | A01K 89/016 |
| | | | 192/45.018 |
| 6,036,130 A | 3/2000 | Tietjen | |
| 7,216,825 B2 * | 5/2007 | Oishi | A01K 89/0186 |
| | | | 242/247 |

(Continued)

FOREIGN PATENT DOCUMENTS

GB    22420    10/1913

*Primary Examiner* — Emmanuel M Marcelo
(74) *Attorney, Agent, or Firm* — Richard C. Litman

(57) ABSTRACT

The lever-operated fishing reel is geared to rotate the line spool through several revolutions for each arcuate operation of a reciprocating rewind lever, to provide for single handed operation. The mechanical advantage provided through the gear train from the line spool back to the lever is obviated through a unidirectional rotational device, preferably a sprag, with another such device operating to prevent unwinding of the line from the spool as the lever is recycled. The gear train between the lever and spool may be disengaged to allow for casting, and the gear case may be oriented as desired relative to the spool housing to position the rewind lever as desired by the angler. The orientation of the mechanism may be reversed by opening the gear case, inverting the unidirectional rotational devices, and moving the rod attachment cleat from one side of the reel to the other.

16 Claims, 6 Drawing Sheets

(56) References Cited

U.S. PATENT DOCUMENTS

| | | | |
|---|---|---|---|
| 7,464,891 B2 | 12/2008 | Bao-Coutado | |
| 2005/0247809 A1* | 11/2005 | Terauchi | A01K 89/017 242/250 |
| 2010/0006688 A1* | 1/2010 | Ikuta | A01K 89/01931 242/297 |
| 2015/0305315 A1* | 10/2015 | Iwai | A01K 89/033 242/303 |

* cited by examiner

LEVER-OPERATED FISHING REEL

CROSS-REFERENCE TO RELATED APPLICATION

This application claims the benefit of U.S. Provisional Patent Application Ser. No. 62/142,452, filed Apr. 2, 2015.

BACKGROUND OF THE INVENTION

1. Field of the Invention

The present invention relates generally to fishing tackle and equipment, and particularly to a lever-operated fishing reel enabling an angler to reel in the fishing line by means of a reciprocating lever extending from the reel mechanism.

2. Description of the Related Art

The conventional fishing reel uses a rotating crank handle extending from one side or end of the reel, to reel in the fishing line. Many such reels provide a gear train between the crank handle and the reel spool in order to produce multiple revolutions of the spool for each rotation of the crank, thus speeding up the rewind process. However, the basic problem remains that the angler must rotate the crank handle through multiple revolutions in order to rewind any significant length of fishing line. While this process is tedious for most anglers, it can still be carried out, even though it is a time-consuming operation that requires two hands, one to hold the rod and the other to operate the reel crank.

In some cases the rewind operation cannot be readily accomplished by anglers with certain physical handicaps, e.g., arthritis or perhaps a missing limb or digit and/or other physical infirmities. As a result, a number of fishing reels have been developed in the past with rewind mechanisms operated by a reciprocating lever. While such lever-operated fishing reels eliminate the need to rotate a crank to rewind the fishing line and thus allow single handed operation, they introduce other problems that limit their utility. Many, if not most, such reels have relatively weak mechanisms that can be damaged by relatively light tension on the fishing line. In addition, most such reels have limited versatility and cannot be readily modified for use as a casting or fly reel or to change the orientation or "handedness" of the reel.

Thus, a lever-operated fishing reel solving the aforementioned problems is desired.

SUMMARY OF THE INVENTION

The lever-operated fishing reel includes a gear train that is operated by a reciprocating lever to reel in the fishing line. The gear train provides a significant increase in the rotational speed of the line spool upon actuation of the lever, with movement of the lever through an arc of e.g. thirty degrees, more or less, producing several revolutions of the line spool. All gears are completely circular, i.e., they are not gear segments or quadrants, in order to provide continuous rotation as the lever is operated. The gear train is locked by a unidirectional rotational device, e.g., a sprag or roller clutch, etc., to lock the gear train as the lever returns to its starting position in order to allow for winding and to prevent the line from unreeling during the lever return.

The resulting mechanical advantage of the gearing from the spool to the lever results in significant multiplication of force from the spool to the lever. These forces are obviated by another unidirectional rotational device (sprag, etc.) that locks the gear train when substantial force is applied to the line, thus preventing those forces from being multiplied back through the gear train. The gears used in the mechanism are preferably formed from high strength steel in order to provide greater protection against damage.

The lever-operated fishing reel provides additional versatility for use as a casting reel, by selectively disengaging the gear train for casting. This is accomplished by the installation of an intermediate gear(s) on a bellcrank mechanism that can be selectively pivoted by a lever extending from the reel case or housing to engage or disengage the gear train.

The mechanism is easily reversed to reverse the orientation of the reel and lever. This is accomplished by opening the reel case or housing to access the two unidirectional rotational devices (sprags, etc.), inverting the two sprags (ratchets, etc.) to reverse their freely rotating and locking directions, and moving the rod attachment cleat from one side of the reel housing or case to the other. Moreover, the gear case can be rotated relative to the spool housing to adjust the orientation of the line rewind lever and gear train release lever as desired.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The lever-operated fishing reel permits one handed operation by the angler using the reel when reeling in the line. This is accomplished by an arcuately reciprocating lever that extends generally radially from the reel case, to allow the angler to hold the rod and reel with the hand and manipulate the lever with one or more of the fingers of the same hand. Various other advantages are also provided by the present lever-operated fishing reel.

Figure 1:
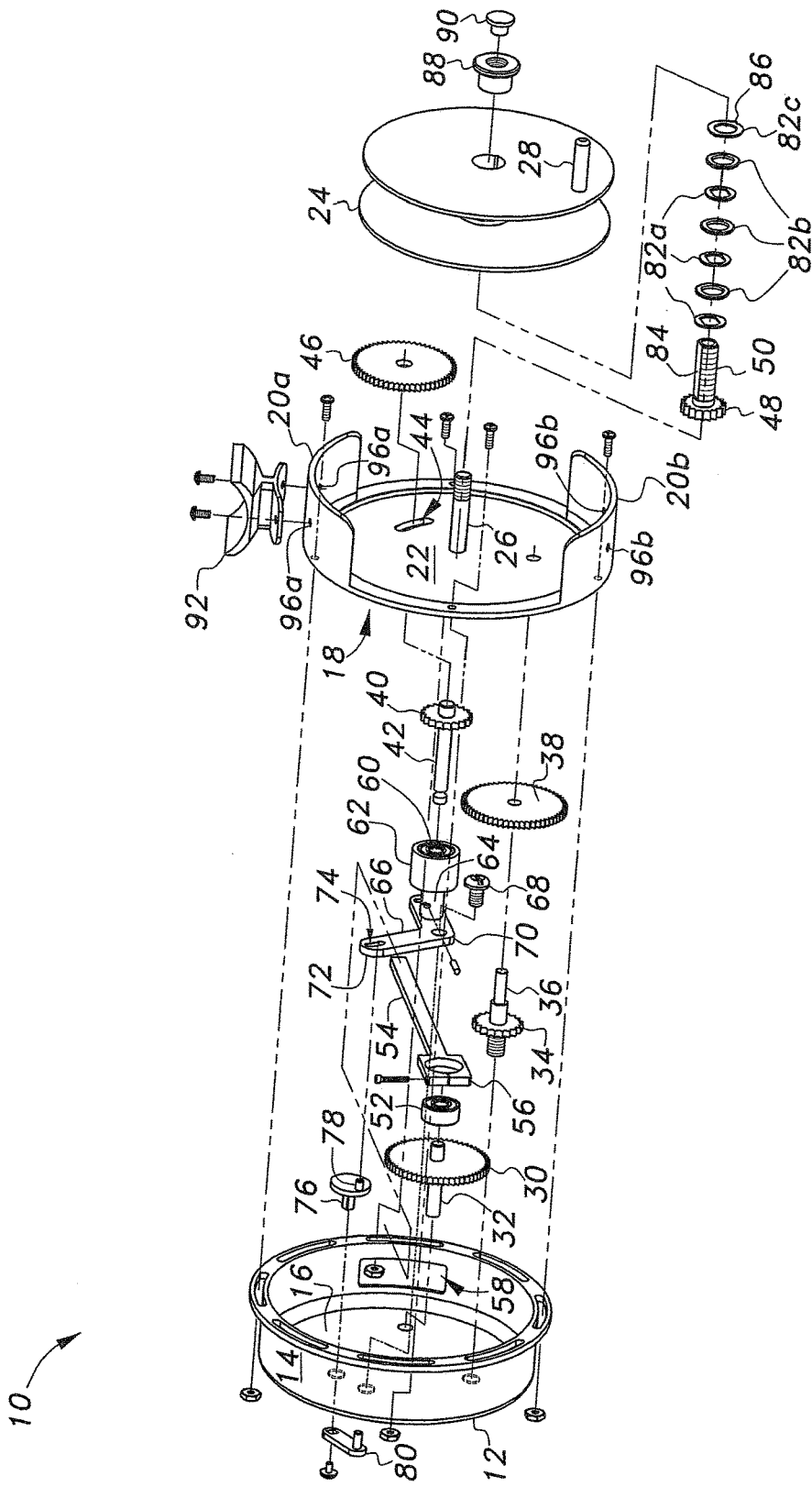
FIG. 1 is an exploded perspective view of a lever-operated fishing reel according to the present invention, illustrating its various components and their relationships to one another.
Figure 2:
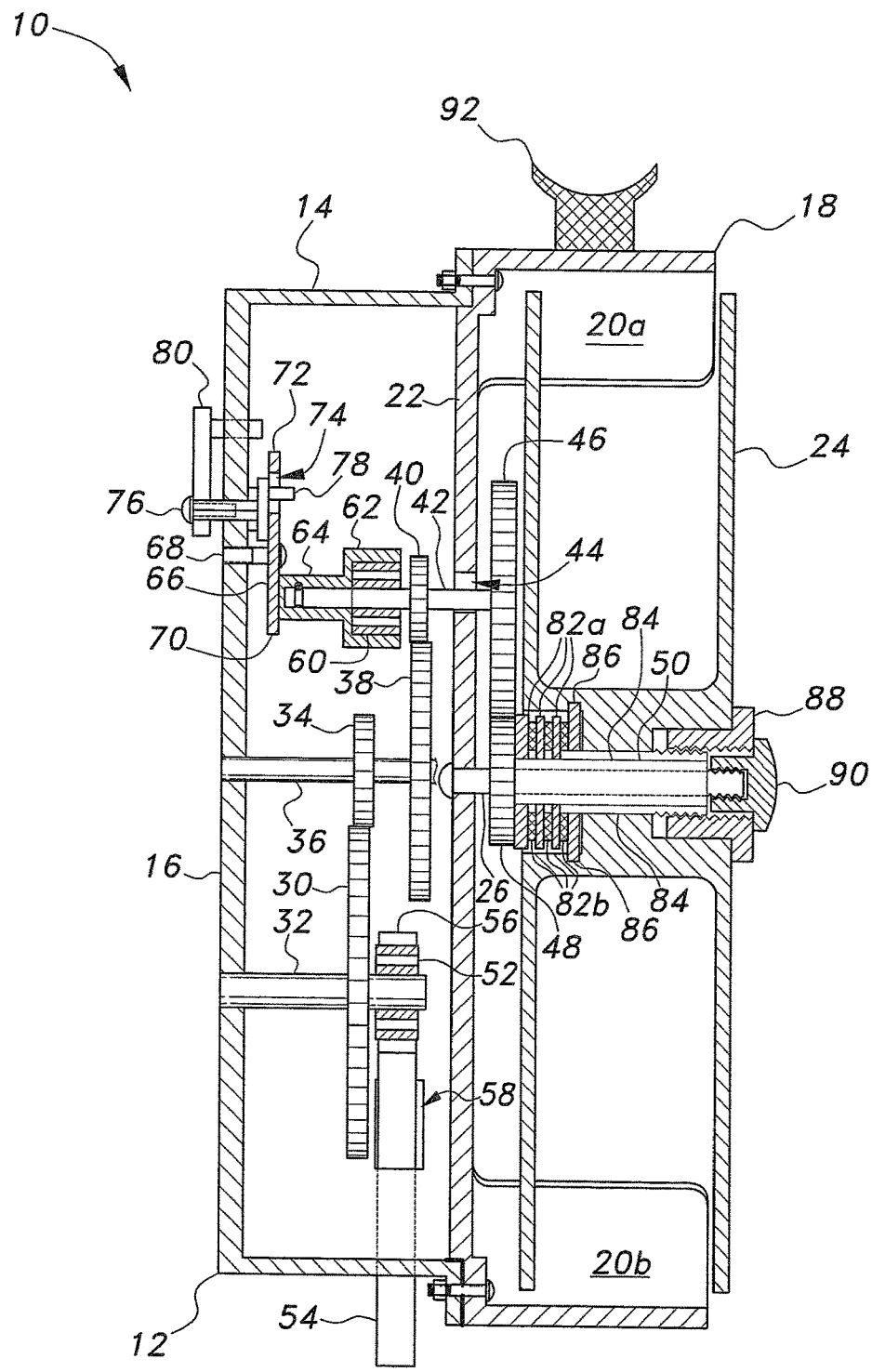
FIG. 2 is a side elevation view in section of the assembled lever-operated fishing reel according to the present invention, illustrating further details of its construction.

FIG. 1 of the drawings is an exploded perspective view illustrating the various components of the lever-operated fishing reel, or reel, 10, with FIG. 2 providing a side elevation view in section of the assembled components of the reel 10. The reel 10 includes a substantially circular gear case 12 having a circumferential side wall 14 and a rear wall 16, with most of the components installing within the gear case 12 when the reel 10 is assembled. A spool housing 18 is disposed concentrically within or upon the gear case 12 when the reel 10 is assembled, with the spool housing 18 having mutually opposed semicircumferential first and second side wall segments 20a and 20b extending from the rim of its rear wall 22. The separate wall segments 20a, 20b define open circumferential gaps therebetween that provide clearance for the operation of the lever, as described further below. A fishing line spool 24 is installed concentrically upon a central axle 26 extending from the rear wall 22 of the spool housing 18. The spool 24 may include a radially offset crank handle 28 (not shown in FIG. 2) for conventional reel operation if so desired, but the handle 28 is not required due to the operation of the reel 10 by means of its lever, as explained further below.

A gear train is disposed within the gear case 12. A relatively large diameter first or input gear 30 is mounted on a rotary shaft 32 that in turn extends from the inside of the rear wall 16 of the gear case 12. This first or input gear 30 engages a relatively smaller diameter second or first intermediate gear 34, which shares a shaft 36 and is rotationally fixed to a relatively larger third or second intermediate gear 38. The second intermediate gear 38 in turn meshes with a relatively smaller diameter third intermediate gear 40 that is rotationally affixed to a shaft 42. One end of the shaft 42 passes through an arcuate slot 44 in the rear wall 22 of the spool housing 18, with a relatively larger diameter fourth intermediate gear 46 being rotationally affixed to the shaft 42 and thus to the third intermediate gear 40. The fourth intermediate gear 46 is on the opposite side of the rear wall 22 of the spool housing 18 from the third intermediate gear 40, i.e., the fourth intermediate gear 46 is located between the rear wall 22 of the spool housing 18 and the spool 24. This fourth intermediate gear 46 in turn meshes with a relatively smaller diameter final or output gear 48 that is rotationally affixed to a hollow clutch or drag shaft 50 that rotates upon the axle 26 extending from the rear wall 22 of the spool housing 18. Thus, it will be seen that larger diameter gears with their greater number of teeth progressively drive the smaller diameter gears with their lesser number of teeth, thus progressively multiplying and increasing the rotational speed of each of the smaller gears such that the rotational speed of the line spool 24 is increased many times over the rotational speed of the first or input gear 30. The various gears are preferably formed of high strength steel for maximum durability.

A first unidirectional rotation device 52 is removably installed upon the end of the first or input gear shaft 32. The unidirectional rotation device 52 has an inner race or housing that is rotationally affixed to the shaft 32, and an outer race or housing that can rotate in only one direction relative to the inner race or housing. A lever 54 has a clamp end 56 that is removably clamped (e.g., pinch bolt) about the outer race or housing of the device 52. The first unidirectional rotation device 52 is preferably a sprag to provide smoother operation, but may alternatively comprise some other type or principle of unidirectional rotation device, such as a ratchet. The distal or handle end of the lever 54 extends radially from the gear case 12, through a passage 58 through the circumferential wall 14 of the gear case 12. Arcuate movement of the lever 54 in a first direction results in the unidirectional rotation device 52 rotationally locking, thereby transmitting rotational force to the first or input gear 30 and thus to the rest of the gears in the gear train, to the final or output gear 48 and its shaft 50. Moving the lever 54 in the opposite direction unlocks the unidirectional rotation device 52, allowing the lever 54 to return to its starting position while the gear train remains stationary.

The above-described operation makes no provision to prevent any torsional force on the spool 24 from reversing the gear rotation described above, which would negate the operation of the lever 54. Accordingly, a second unidirectional rotation device 60 is removably installed upon the third intermediate gear shaft 42. The inner race or housing of this second device 60 is rotationally affixed to the shaft 42, while the outer race or housing is rotationally affixed within a socket 62 extending from a rotationally fixed hollow shaft 64. The hollow shaft 64 permits the third intermediate gear shaft 42 to rotate therein. The second unidirectional rotation device 60 is also most preferably a sprag, but other types or principles of unidirectional rotation devices may be used, as in the case of the first device 52 described further above. However, the second rotational device 60 is oriented to permit relative rotation in the opposite direction of that permitted by the first rotational device 52, and to lock rotation in the opposite direction of that locked by the first rotational device 52. Thus, when the gear train is rotated by the first rotational device 52, the second rotational device 60 allows free rotation therethrough to allow gear rotation to be transmitted completely through the gear train. However, when the lever 54 is reciprocated in the opposite direction, i.e., it releases rotationally from the gear train by means of the free-wheeling rotational direction of the first sprag or unidirectional rotation device 52, the second unidirectional rotation device or sprag 60 locks rotationally to prevent rotation of the gear train in the undesired opposite direction.

Figure 3A:
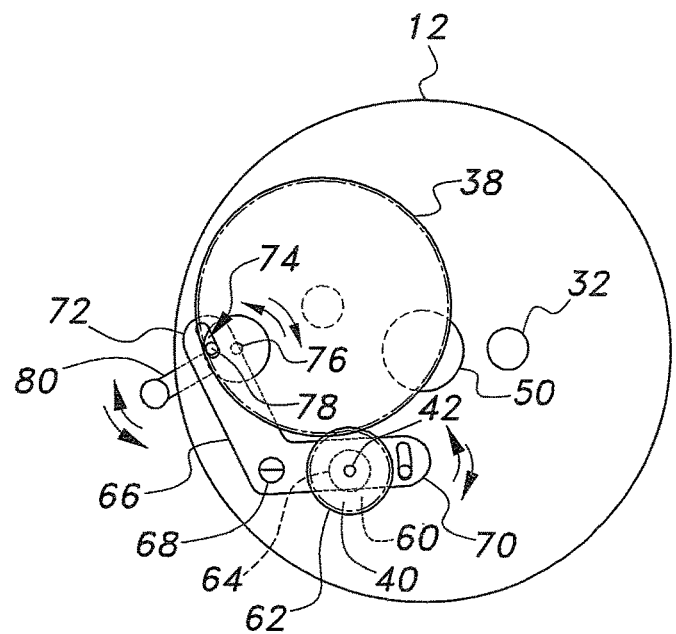
FIG. 3A is a schematic side elevation view in section showing the engagement of the intermediate gears of the gear train of the lever-operated fishing reel according to the present invention.
Figure 3B:
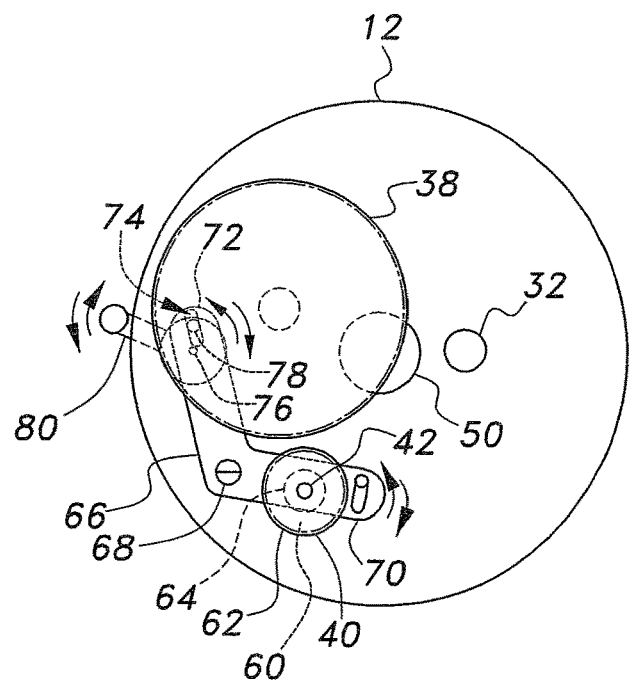
FIG. 3B is a schematic side elevation view in section showing the disengagement of the intermediate gears of the gear train of the lever-operated fishing reel according to the present invention, for casting operations.

It will be seen that the above-described mechanism will not permit free rotation of the spool 24 in both directions, due to the constant engagement of all gears and the opposite locking of the two sprags 52 and 60 (or other unidirectional rotation devices). Accordingly, provision is made to disengage a portion of the gear train to permit the spool 24 to rotate in both directions. FIGS. 3A and 3B provide schematic illustrations of the engagement (FIG. 3A) and disengagement (FIG. 3B) of the third intermediate gear 40 with the remainder of the gear train. The shaft 64 for the second unidirectional rotation device 60 is mounted on a bellcrank 66 that is pivotally affixed to the rear wall 16 of the gear case 12 by a pivot pin, screw, or bolt 68. The bellcrank 66 has a first arm 70 extending from the pivot 68, with the shaft 64 that carries the socket 62 for the second unidirectional rotation device 60 and the shaft 42 for the third intermediate gear 40 extending from the first arm 70 and rotationally affixed thereto. (A stationary pin extending from the rear wall 16 of the gear case or housing 12 engages a slot in the first arm 70 of the bellcrank 66 to limit the arcuate movement of the bellcrank, as shown in FIGS. 3A and 3B.) A second arm 72 having a slot 74 formed therein extends from the pivot 68, with the pivot 68 being disposed generally between the two arms 70 and 72.

A gear selector shaft 76 extends through a passage in the rear wall 16 of the gear case 12. The gear selector shaft 76 has a radially offset or eccentric pin 78 extending therefrom, with the pin 78 riding in the slot 74 of the second arm 72 of the bellcrank 66. A crank handle 80 is affixed to the end of the gear selector shaft 76 that extends outside the gear case 12. Actuation of the crank handle 80 swings the offset pin 78 in an arc, with the pin 78 driving the second arm 74 (and thus the first arm 70 as well) of the bellcrank 66 through a corresponding arc by means of the pin 78 engagement with the slot 74. As the third intermediate gear 40 is carried on the first arm 70 of the bellcrank 66 by means of its shaft 42 and the socket shaft 64 extending from the first arm 70, it will be seen that arcuate manipulation of the crank handle 80 will selectively swing the third intermediate gear 40 into or out of engagement with the larger second intermediate gear 38. Thus, when the two gears 40 and 38 are not engaged, the spool 24 is free to rotate in either direction without imposing undue torsional loads on the remainder of the gear train.

Returning to FIG. 1, an adjustable line drag (friction) mechanism is disposed within the spool housing 18 and the hub of the spool 24, between the spool 24 and the final or output gear 48, to allow the angler to adjust the freedom of rotation of the spool 24 as desired. The adjustable line drag mechanism comprises a plurality of first friction washers 82a and second friction washers 82b, in an alternating array along the clutch or drag shaft 50. The first friction washers 82a are formed of steel and have internal flats within their open centers, which flats engage the corresponding flats 84 formed along the sides of the clutch or drag shaft 50. The second friction washers 82b are formed of a fiber material and are adjustably compressed between the first friction washers 82a, with greater compression resulting in greater friction. The final friction washer 82c is formed of steel and has opposed protruding ears or lugs 86 that engage corresponding recesses in the hub of the reel spool 24. The degree of compression of the washers 82a through 82c is controlled by a drag adjustment nut 88 that is threaded onto the end of the clutch or drag shaft 50. Tightening or loosening this adjustment nut 88 increases or decreases the compression of the various clutch or friction discs or washers 82a through 82c, thus increasing or decreasing the drag or friction between the reel spool 24 and the clutch or drag shaft 50, and thus the gear train. The clutch or drag shaft 50 is retained within the hub of the reel spool 24 by a retaining nut 90 that captures the drag adjustment nut 88 between the nut 90 and the reel spool 24.

The lever-operated fishing reel 10 allows the user or angler to adjust the position of the lever 54 relative to the gear case or housing 12 and the remainder of the mechanism to suit his or her personal preferences, as noted further above. FIGS. 4A through 4E provide schematic views showing various orientations of the lever 54 relative to the gear case or housing 12. These views are from the orientation of the back of the gear case or housing 12, with the back wall 16 of the housing removed to show the first or input gear 30, its shaft 32, and the lever 54. The rod attachment cleat 92 extends from one of the two semicircumferential wall segments 20a or 20b of the spool housing 18, with the spool housing 18 being behind the gear case or housing 12 in the views shown in FIGS. 4A through 4E.

It will be seen that the circumferential flange of the gear case or housing 12 includes a series of eight arcuate slots 94a through 94h therein. (While eight slots are shown and described, it should be noted that more or fewer such slots may be provided as desired.) These slots 94a through 94h serve as the mounting holes or passages for the screws that secure the spool housing 18 to the gear case or housing 12, and permit the spool housing 18 to be rotated relative to the gear case or housing 12 and secured in any desired rotational relationship. Moreover, the multiple slots 94a through 94h permit each individual attachment screw to be moved to the next adjacent slot, if there is insufficient arcuate adjustment provided by any given slot(s). Thus, the rotational relationship between the gear case or housing 12 and the spool housing 18 may be rotationally adjusted to practically any rotational relationship desired.

Figure 4A:
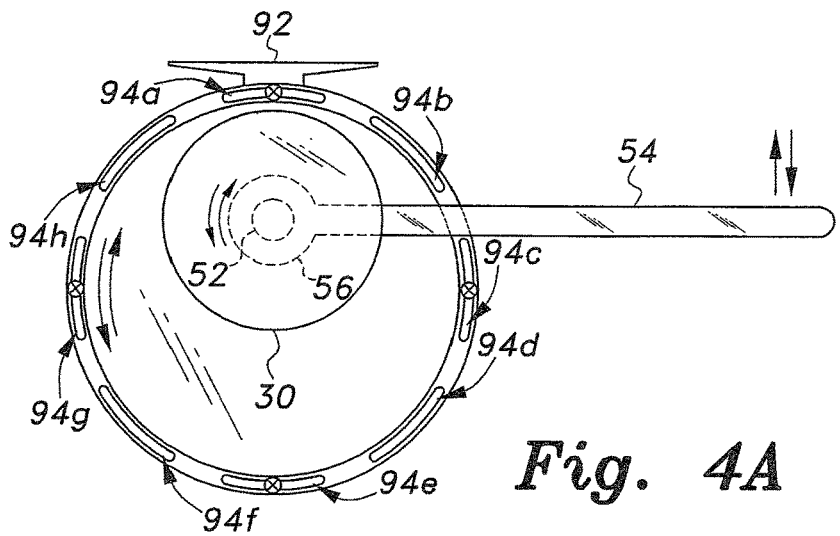
FIGS. 4A, 4B, 4C, 4D, and 4E illustrate a series of different orientations of the lever mechanism and its rotational center relative to the spool housing of the lever-operated fishing reel according to the present invention.
Figure 4B:
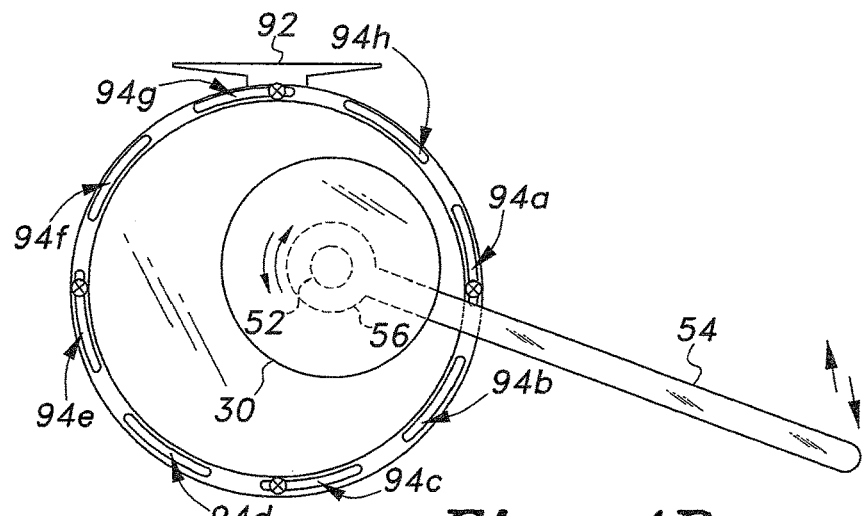
Figure 4C:
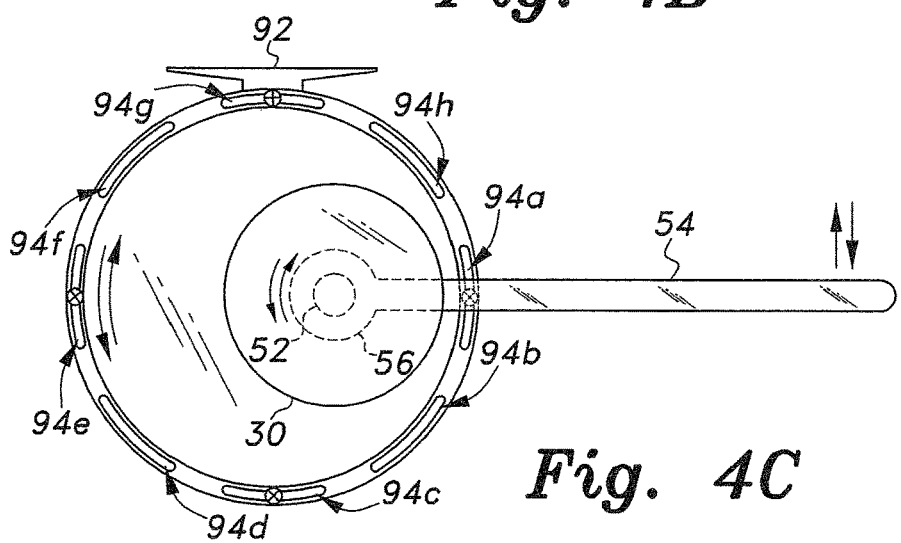

FIG. 4A illustrates a first orientation of the gear case 12 relative to the spool housing 18, with the first slot 94a oriented at the top of the assembly and the first or input gear 30 and its first unidirectional orientation device 52 (sprag, etc.) oriented at the top of the gear housing or case 12. The lever 54 has been secured to the sprag 52 (or other device) so as to extend to the right from the case 12, as shown in the orientation of FIG. 4A. However, in FIG. 4B an alternative positional adjustment is shown. In FIG. 4B the gear case or housing 12 has been rotated clockwise approximately eighty degrees relative to the orientation shown in FIG. 4A. It will be noted that the relative rotation between FIGS. 4A and 4B is not a complete quarter of a rotation, i.e., ninety degrees, as the balance of the slot 94a is above its attachment screw. In FIG. 4C, the gear case 12 has been rotated slightly farther to orient the housing 12 ninety degrees from the orientation shown in FIG. 4A. In each case the clamp end 56 of the lever 54 has been adjusted on the unidirectional orientation device 52 so that the lever 54 extends from the case 12 in the desired orientation. (The gear case or housing 12 may have multiple elongated lever passages through the side wall of the case, rather than the relatively small single passage 58 shown in FIG. 1.)

Figure 4D:
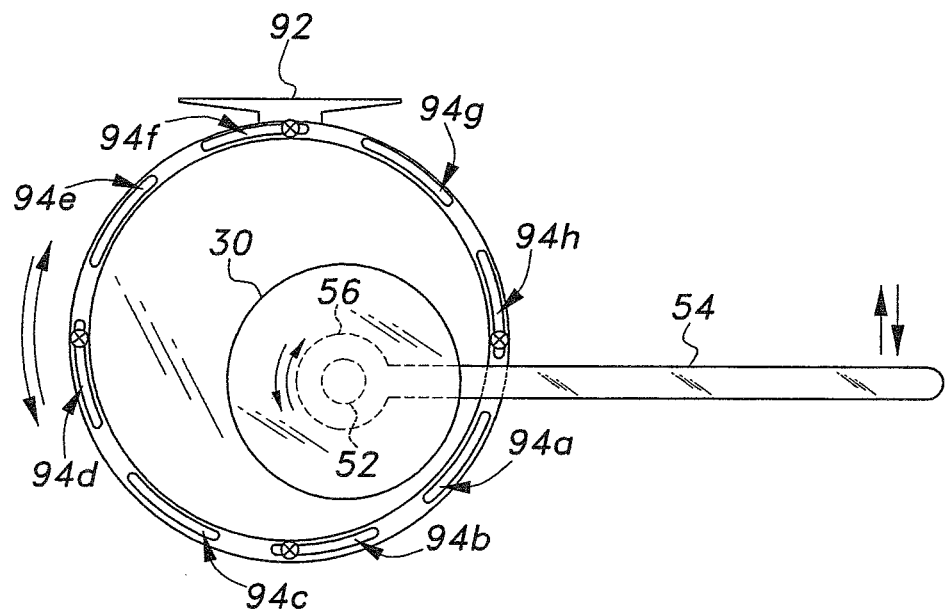
Figure 4E:
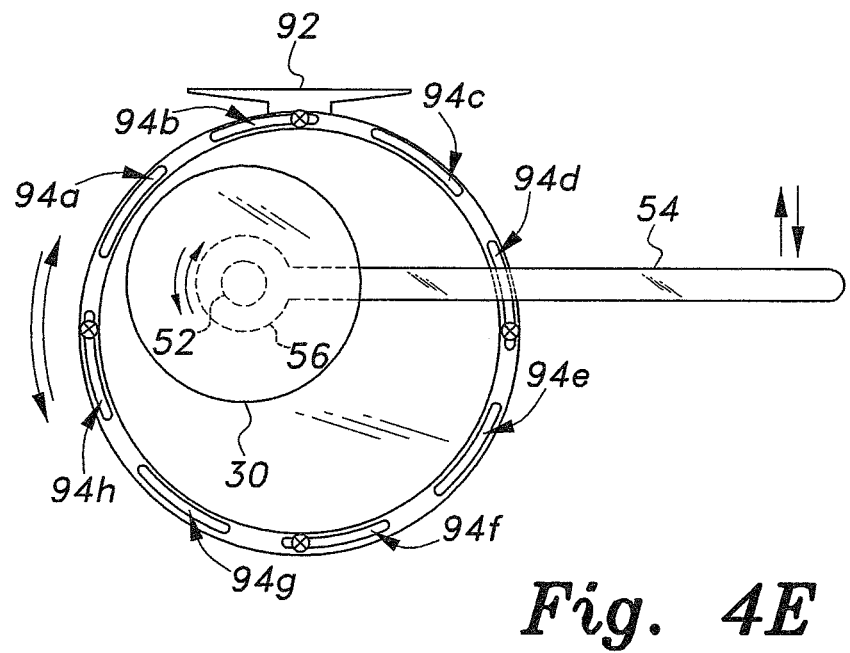

FIGS. 4D and 4E show further rotations of the gear case or housing 12 relative to the spool housing. In FIG. 4D, the gear case 12 is shown rotated about 120 degrees clockwise from its initial position in FIG. 4A. The orientation of the lever 54 has been adjusted accordingly. Finally in FIG. 4E, the gear case or housing 12 is shown rotated about 300 degrees clockwise (or alternatively, 60 degrees counterclockwise) from its original position shown in FIG. 4A. As in other orientations, the lever 54 has also been adjusted accordingly. This versatility permits the user of the lever-operated fishing reel 10 to adjust or orient various components of the reel assembly to suit himself or herself as desired, in order to position the lever 54 for optimum operation.

Figure 5A:
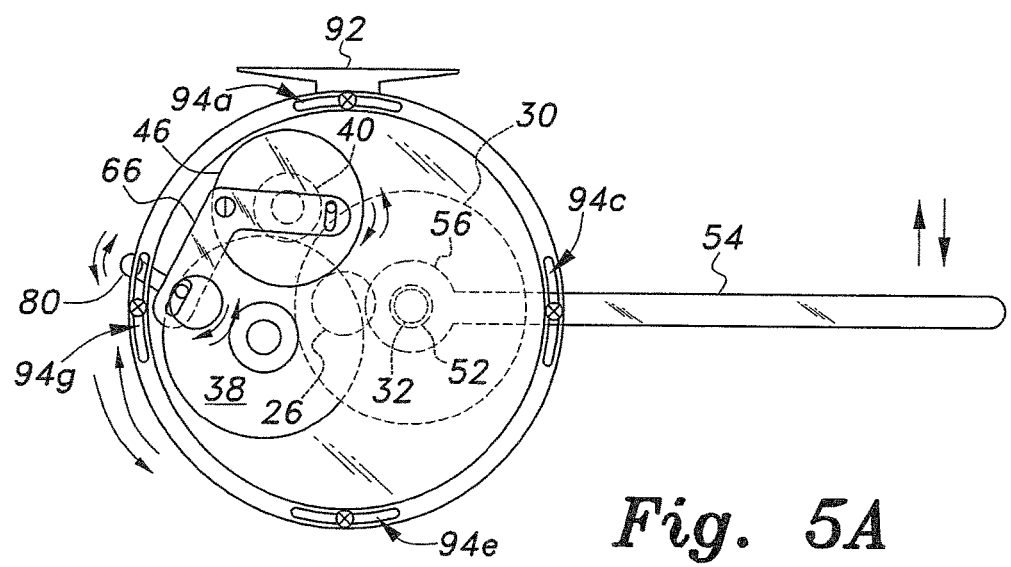
FIG. 5A is a schematic side elevation view in section showing a first orientation of the intermediate gear engagement and disengagement mechanism of the lever-operated fishing reel according to the present invention.
Figure 5B:
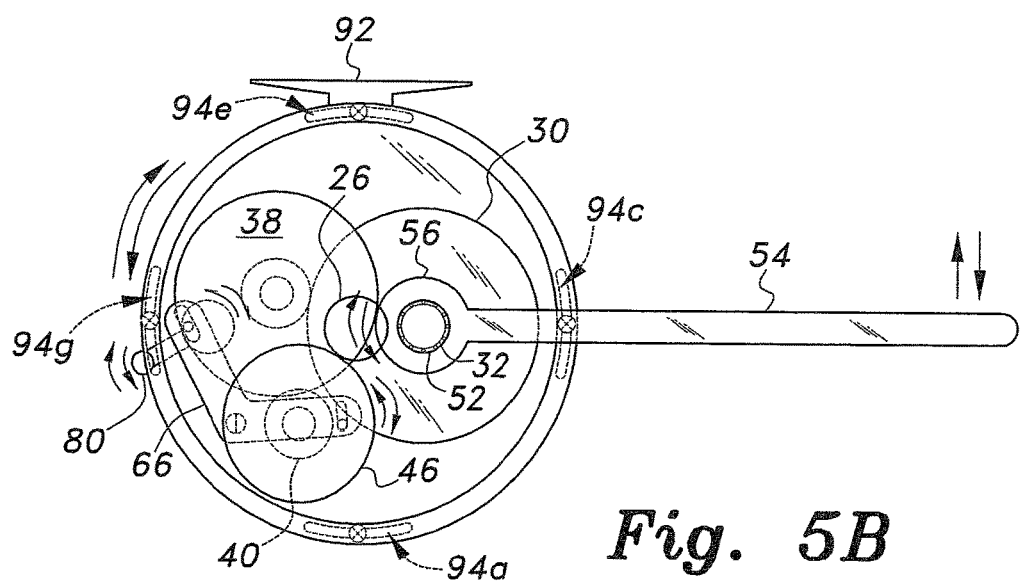
FIG. 5B is a schematic side elevation view in section showing a second orientation of the intermediate gear engagement and disengagement mechanism of the lever-operated fishing reel according to the present invention, the second orientation being essentially opposite the first orientation illustrated in FIG. 5A.

The lever-operated fishing reel 10 further permits the lever 54 to be positioned to either side of the case 12, as desired. This permits the lever 54 to be positioned to the left or right side of the case 12 according to the desires of the angler, or alternatively for the case 12 (and remaining mechanism) to be positioned either above or below the fishing rod with the lever 54 to either side as desired. FIGS. 5A and 5B provide schematic illustrations showing the inversion of the case 12 and mechanism between the two Figs. In FIG. 5A, the mechanism is shown in orientation for left hand lever operation, i.e., the spool 24 (shown in other Figs.) would be located on the back side of the case 12 illustrated. In FIG. 5B, the case 12 is shown inverted relative to the orientation of FIG. 5A, i.e., the spool 24 and its housing 18 (normally in front of the case 12 and its internal mechanisms, in this orientation) are removed to show the internal orientation of the components.

The lever-operated fishing reel 10 is quickly and easily reconfigured to either of the arrangements illustrated in FIGS. 5A and 5B. It will be noted that the gear case or housing 12 is inverted in FIG. 5B, in comparison to FIG. 5A. The orientation illustrated in FIG. 5A corresponds approximately to the orientation shown in FIG. 2 of the drawings, while the orientation shown in FIG. 5A corresponds approximately to the orientation illustrated in FIG. 1. Four of the eight slots 94a through 94h shown in FIGS. 4A through 4E are shown in FIGS. 5A and 5B, i.e., slots 94a, 94c, 94e, and 94g, to assist in visualizing the orientation of the gear case or housing 12 in FIGS. 5A and 5B.

A series of steps is involved to reconfigure the mechanism shown in FIG. 5A to that shown in FIG. 5B. First, the spool 24 and spool housing 18 are removed from the gear casing or housing 12. It will be seen that the third intermediate gear 40 and its shaft 42 are retained in the shaft 64 by a tangential pin that engages a circumferential groove in the shaft 64, allowing the shaft 64 and its gear 40 to be removed. This provides access to the second sprag 60 (or other unidirectional rotation device), whereupon the device 60 is removed from its socket 62 and turned over from its first orientation (which precluded free rotation in a first rotational direction while freely rotating in a second rotational direction) to its second orientation, reversing the lockup and free rotational directions.

At this point, essentially the same procedure is applied to the first unidirectional rotation device 52, e.g., sprag, etc. The lever 54 is removed from the device 52, and the sprag 52 (or other unidirectional rotation device) is turned over from its first orientation (which permitted free rotation in a first rotational direction while precluding rotation in a second rotational direction) to its second orientation, reversing the free rotational and lockup directions. The lever 54 is then replaced on the unidirectional rotation device 52 and rotated to adjust its orientation from the case 12 as desired, and then tightened on the device 52. Finally, the rod attachment cleat 92 is removed from its attachment to the first wall segment 20a of the spool housing 18, and reinstalled on the second wall segment 20b. Each of the wall segments 20a, 20b serves as a cleat attachment and includes screw holes or passages, respectively 96a and 96b (shown in FIG. 1), permitting the cleat 92 to be attached to either of the wall segments 20a or 20b as desired. The result is a completely reversible lever-operated fishing reel 10 that may be attached to the pole with the lever 54 extending either forward or rearward from the gear case 12 as desired, to facilitate lever operation using one hand or at least requiring minimal manipulation by means of both hands.

It is to be understood that the present invention is not limited to the embodiments described above, but encompasses any and all embodiments within the scope of the following claims.

I claim:

1. A lever-operated fishing reel, comprising:
   a gear case;
   a spool housing disposed concentrically upon the gear case;
   a fishing line spool disposed concentrically within the spool housing;
   an arcuately reciprocating rewind lever extending from the gear case;
   a gear train disposed between the lever and the spool, the gear train multiplying rotational speed of the spool relative to operation of the lever, the gear train having at least one intermediate gear therein;
   a first unidirectional rotation device disposed between the lever and the gear train, the first unidirectional rotation device permitting free rotation between the lever and the gear train in a first direction of rotation and precluding rotation between the lever and the gear train in a second direction of rotation; and
   a second unidirectional rotation device disposed at the at least one intermediate gear of the gear train, the second unidirectional rotation device precluding rotation between the lever and the spool in the first direction of rotation and permitting free rotation between the lever and the spool in the second direction of rotation.

2. The lever-operated fishing reel according to claim 1, wherein:
   the first unidirectional rotation device is selectively positionable between a first orientation and a second orientation, the first unidirectional rotation device permitting free rotation between the lever and the gear train in the first direction of rotation while precluding rotation between the lever and the gear train in the second direction of rotation when positioned in the first orientation, and precluding rotation between the lever and the gear train in the first direction of rotation and permitting free rotation between the lever and the gear train in the second direction of rotation when positioned in the second orientation; and
   the second unidirectional rotation device is selectively positionable between a third orientation and a fourth orientation, the second unidirectional rotation device precluding rotation between the lever and the spool in the first direction of rotation while permitting free rotation between the lever and the spool in the second direction of rotation when positioned in the third orientation, and permitting free rotation between the lever and the spool in the first direction of rotation and precluding rotation between the lever and the spool in the second direction of rotation when positioned in the fourth orientation.

3. The lever-operated fishing reel according to claim 1, further comprising a bellcrank disposed within the gear case, the at least one intermediate gear being disposed upon the bellcrank, the bellcrank being selectively adjustable to selectively engage and disengage the at least one intermediate gear with the gear train.

4. The lever-operated fishing reel according to claim 3, wherein:
   the bellcrank has a first arm, a second arm, and a pivot disposed therebetween;
   the first arm has an intermediate gear shaft extending therefrom, the second unidirectional rotation device and the intermediate gear being disposed upon the intermediate gear shaft;
   the second arm of the bellcrank has a slot defined therein; and
   the lever-operated fishing reel further comprises a gear selector shaft disposed through the gear case, the gear selector shaft having an offset pin extending therefrom, the offset pin engaging the slot in the second arm of the bellcrank, whereby rotation of the gear selector shaft pivots the bellcrank to selectively move the intermediate gear between an engaged position and a disengaged position.

5. The lever-operated fishing reel according to claim 1, further comprising:
   a first cleat attachment disposed on the spool housing and a second cleat attachment disposed on the spool housing opposite the first cleat attachment; and
   a rod attachment cleat selectively disposed upon one of the cleat attachments of the spool housing.

6. The lever-operated fishing reel according to claim 1, further comprising an adjustable line drag mechanism disposed within the spool housing and spool.

7. The lever-operated fishing reel according to claim 1, wherein the first and second unidirectional rotation devices each comprise a unidirectional rotation device selected from the group consisting of sprags and ratchets.

8. A lever-operated fishing reel, comprising:
a gear case;
a spool housing disposed concentrically upon the gear case;
a fishing line spool disposed concentrically within the spool housing;
an arcuately reciprocating rewind lever extending from the gear case;
a gear train disposed between the lever and the spool, the gear train multiplying rotational speed of the spool relative to operation of the lever, the gear train having at least one intermediate gear therein; and
a bellcrank disposed within the gear case, the at least one intermediate gear being disposed upon the bellcrank, the bellcrank being selectively adjustable to selectively engage and disengage the at least one intermediate gear with the gear train, wherein the bellcrank further includes:
a first arm, a second arm, and a pivot disposed therebetween;
the first arm has an intermediate gear shaft extending therefrom, the second unidirectional rotation device and the intermediate gear being disposed upon the intermediate gear shaft;
the second arm of the bellcrank has a slot defined therein; and
the lever-operated fishing reel further comprises a gear selector shaft disposed through the gear case, the gear selector shaft having an offset pin extending therefrom, the offset pin engaging the slot in the second arm of the bellcrank, whereby rotation of the gear selector shaft pivots the bellcrank to selectively move the intermediate gear between an engaged position and a disengaged position.

9. The lever-operated fishing reel according to claim 8, further comprising:
a first cleat attachment disposed on the spool housing and a second cleat attachment disposed on the spool housing opposite the first cleat attachment; and
a rod attachment cleat selectively disposed upon one of the cleat attachments of the spool housing.

10. The lever-operated fishing reel according to claim 8, further comprising an adjustable line drag mechanism disposed within the spool housing and spool.

11. A lever-operated fishing reel, comprising:
a gear case;
a spool housing disposed concentrically upon the gear case;
a fishing line spool disposed concentrically within the spool housing;
an arcuately reciprocating rewind lever extending from the gear case;
a gear train disposed between the lever and the spool, the gear train multiplying rotational speed of the spool relative to operation of the lever, the gear train having at least one intermediate gear therein;
a first unidirectional rotation device disposed between the lever and the gear train, the first unidirectional rotation device being selectively positionable between a first orientation and a second orientation, the first unidirectional rotation device permitting free rotation between the lever and the gear train in a first direction of rotation and precluding rotation between the lever and the gear train in a second direction of rotation when positioned in the first orientation, and precluding rotation between the lever and the gear train in the first direction of rotation and permitting free rotation between the lever and the gear train in the second direction of rotation when positioned in the second orientation; and
a second unidirectional rotation device disposed at the intermediate gear of the gear train, the second unidirectional rotation device being selectively positionable between a third orientation and a fourth orientation, the second unidirectional rotation device precluding rotation between the lever and the spool in the first direction of rotation and permitting free rotation between the lever and the spool in the second direction of rotation when positioned in the third orientation, and permitting free rotation between the lever and the spool in the first direction of rotation and precluding rotation between the lever and the spool in the second direction of rotation when positioned in the fourth orientation.

12. The lever-operated fishing reel according to claim 11, further comprising a bellcrank disposed within the gear case, the at least one intermediate gear being disposed upon the bellcrank, the bellcrank being selectively adjustable to selectively engage and disengage the at least one intermediate gear with the gear train.

13. The lever-operated fishing reel according to claim 12, wherein:
the bellcrank has a first arm, a second arm, and a pivot disposed therebetween;
the first arm has an intermediate gear shaft extending therefrom, the second unidirectional rotation device and the intermediate gear being disposed upon the intermediate gear shaft;
the second arm of the bellcrank has a slot defined therein; and
the lever-operated fishing reel further comprises a gear selector shaft disposed through the gear case, the gear selector shaft having an offset pin extending therefrom, the offset pin engaging the slot in the second arm of the bellcrank, whereby rotation of the gear selector shaft pivots the bellcrank to selectively move the intermediate gear between an engaged position and a disengaged position.

14. The lever-operated fishing reel according to claim 11, further comprising:
a first cleat attachment disposed on the spool housing and a second cleat attachment disposed on the spool housing opposite the first cleat attachment; and
a rod attachment cleat selectively disposed upon one of the cleat attachments of the spool housing.

15. The lever-operated fishing reel according to claim 11, further comprising an adjustable line drag mechanism disposed within the spool housing and spool.

16. The lever-operated fishing reel according to claim 11, wherein the first and second unidirectional rotation devices each comprise a unidirectional rotation device selected from the group consisting of sprags and ratchets.

* * * * *